United States Patent [19]
Goddard

[11] Patent Number: 5,353,076
[45] Date of Patent: Oct. 4, 1994

[54] PHOTOGRAPHIC CAMERA FOR VARIOUS SIZE EXPOSURES USING ONE-PIECE MASKING BLADE ASSEMBLAGE

[75] Inventor: William H. Goddard, Hilton, N.Y.

[73] Assignee: Eastman Kodak Company, Rochester, N.Y.

[21] Appl. No.: 111,244

[22] Filed: Aug. 24, 1993

[51] Int. Cl.$^5$ .............................................. G03B 37/00
[52] U.S. Cl. ......................................... 354/94; 354/159
[58] Field of Search ................... 354/94, 95, 96, 98, 354/99, 159

[56] References Cited

U.S. PATENT DOCUMENTS

| | | | |
|---|---|---|---|
| 2,002,076 | 5/1935 | Bornmann et al. | 354/159 |
| 2,358,321 | 9/1944 | Fassin | 354/159 |
| 2,522,387 | 9/1950 | Livens | 354/159 |
| 3,348,463 | 10/1967 | Nerwin | 354/274 |
| 3,349,682 | 10/1967 | Nerwin | 354/274 |
| 5,086,311 | 2/1992 | Naka et al. | 354/195.1 |

FOREIGN PATENT DOCUMENTS 619908 10/1935 Fed. Rep. of Germany.
4-282635 10/1992 Japan.

Primary Examiner—Howard B. Blankenship
Attorney, Agent, or Firm—Roger A. Fields

[57] ABSTRACT

A photographic camera capable of taking various size exposures comprises a back frame opening for making a full size exposure on a film in the camera, and respective masking blades supported for pivotal movement between a masking position for masking corresponding portions of the back frame opening to allow only a reduced size exposure to be made on the film and a non-masking position not masking the corresponding portions of the back frame opening to allow a full size exposure to be made on the film. The masking blades are connected via a connecting link having at least one elastic portion which constitutes a living hinge to permit the masking blades to be pivoted between their masking and non-masking positions. Preferably, the masking blades and the connecting link are integral to be one-piece.

3 Claims, 6 Drawing Sheets

PHOTOGRAPHIC CAMERA FOR VARIOUS SIZE EXPOSURES USING ONE-PIECE MASKING BLADE ASSEMBLAGE

FIELD OF THE INVENTION

The invention relates generally to the field of photography, and in particular to a photographic camera capable of taking various size or various format exposures. More specifically, the invention relates to a photographic camera intended to take interspersed full size and panoramic size exposures.

BACKGROUND OF THE INVENTION

Prior art U.S. Pat. No. 5,086,311, issued Feb. 4, 1992, discloses a photographic camera capable of taking interspersed full size and panoramic size exposures. Typically, a full size exposure is about 24.4 mm×36.4 mm and a panoramic size exposure is about 13.3 mm×36.4 mm. Thus, the panoramic size exposure has a stretched-out or panorama-like appearance as compared to the full size exposure.

The '311 patent discloses that, within the camera body, there is provided a (conventional) rectangular back frame opening for making full size exposures on a filmstrip. Also, respective masking blades are supported for pivotal movement between a masking position for masking an upper rectangular portion and a lower rectangular portion of the back frame opening to allow only panoramic size exposures to be made on the filmstrip and a non-masking position not masking the upper and lower portions to preclude panoramic size exposures from being made on the filmstrip, i.e. to allow full size exposures to be made on the filmstrip.

PROBLEM TO BE SOLVED BY THE INVENTION

In U.S. Pat. No. 5,086,311 the actuating mechanism for the masking blades includes separate drive levers and pivot shafts which are individually connected to the masking blades. The drive levers are connected to each other at a motion-transmitting joint or coupling which permits the masking blades to be pivoted between their masking and non-masking positions. Thus, the actuating mechanism is a relative complex and therefore expensive mechanical device.

SUMMARY OF THE INVENTION

According to the invention, a photographic camera capable of taking various size exposures comprises a back frame opening for making a full size exposure on a film in the camera, and respective masking blades supported for pivotal movement between a masking position for masking corresponding portions of the back frame opening to allow only a reduced size exposure to be made on the film and a non-masking position not masking the corresponding portions of the back frame opening to allow a full size exposure to be made on the film, and is characterized in that:

the masking blades are connected via a connecting link having at least one elastic portion which constitutes a living hinge to permit the masking blades to be pivoted between their masking and non-masking positions.

Preferably, the masking blades and the connecting link are integral to be unitary or one-piece.

ADVANTAGEOUS EFFECT OF THE INVENTION

The invention provides a mechanical arrangement which is relatively simple and therefore inexpensive as compared to the mechanical arrangement in U.S. Pat. No. 5,086,311.

DETAILED DESCRIPTION OF THE PREFERRED EMBODIMENT

The invention is disclosed as being embodied in a relatively simple 35 mm still camera. Because such a photographic camera is well known, the description which follows is directed in particular to camera elements forming part of or cooperating directly with the preferred embodiment. It is to be understood, however, that camera elements not specifically shown or described may take various forms known to persons of ordinary skill in the art.

Figure 1:
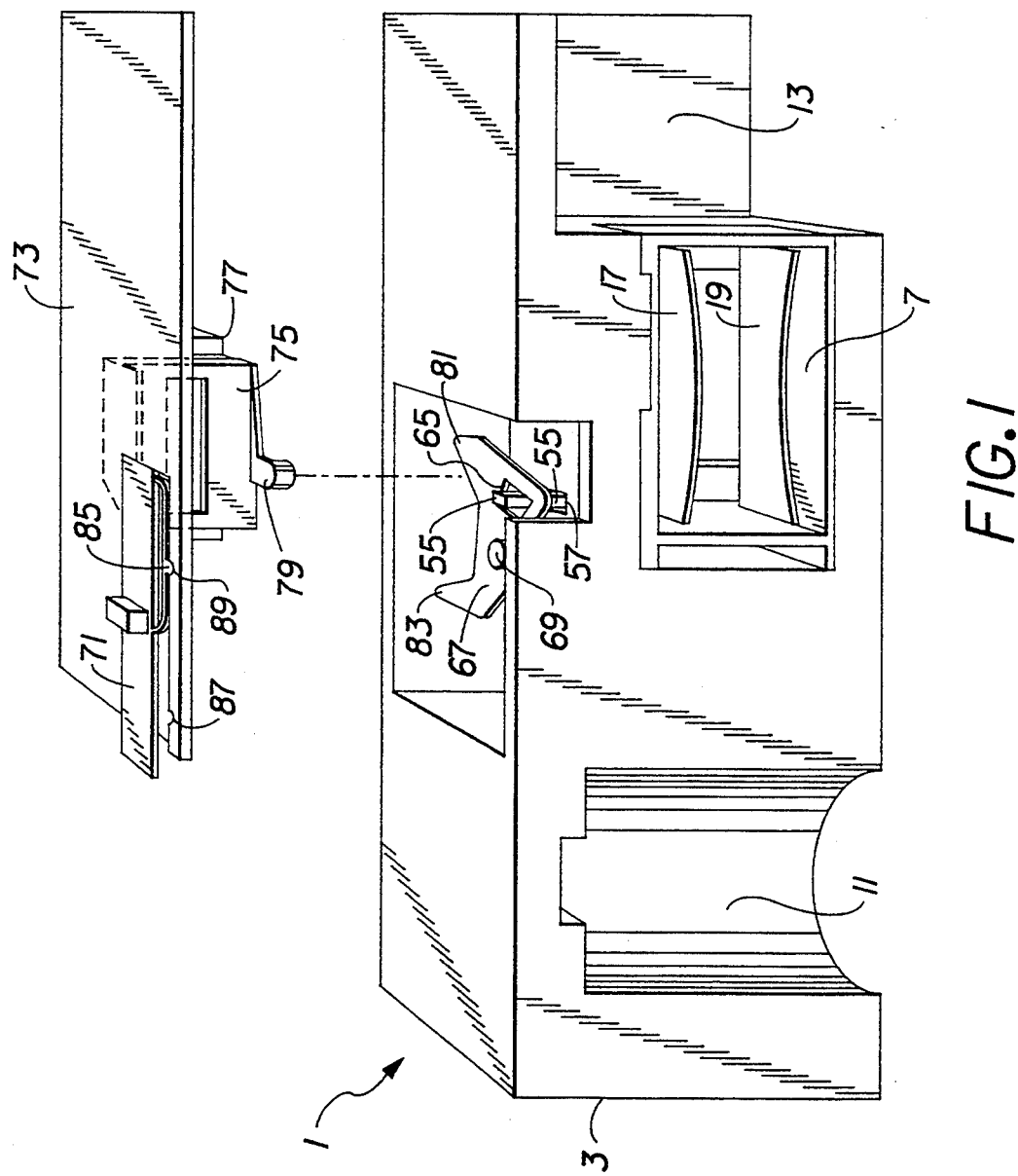
FIG. 1 is an exploded rear perspective view of a photographic camera according to a preferred embodiment of the invention, showing a pair of masking blades in a masking position within a back frame opening of the camera body to make a panoramic size exposure on a filmstrip and a masking frame in a corresponding position behind a front viewfinder lens to provide a panoramic view of the subject to be photographed.
Figure 4:
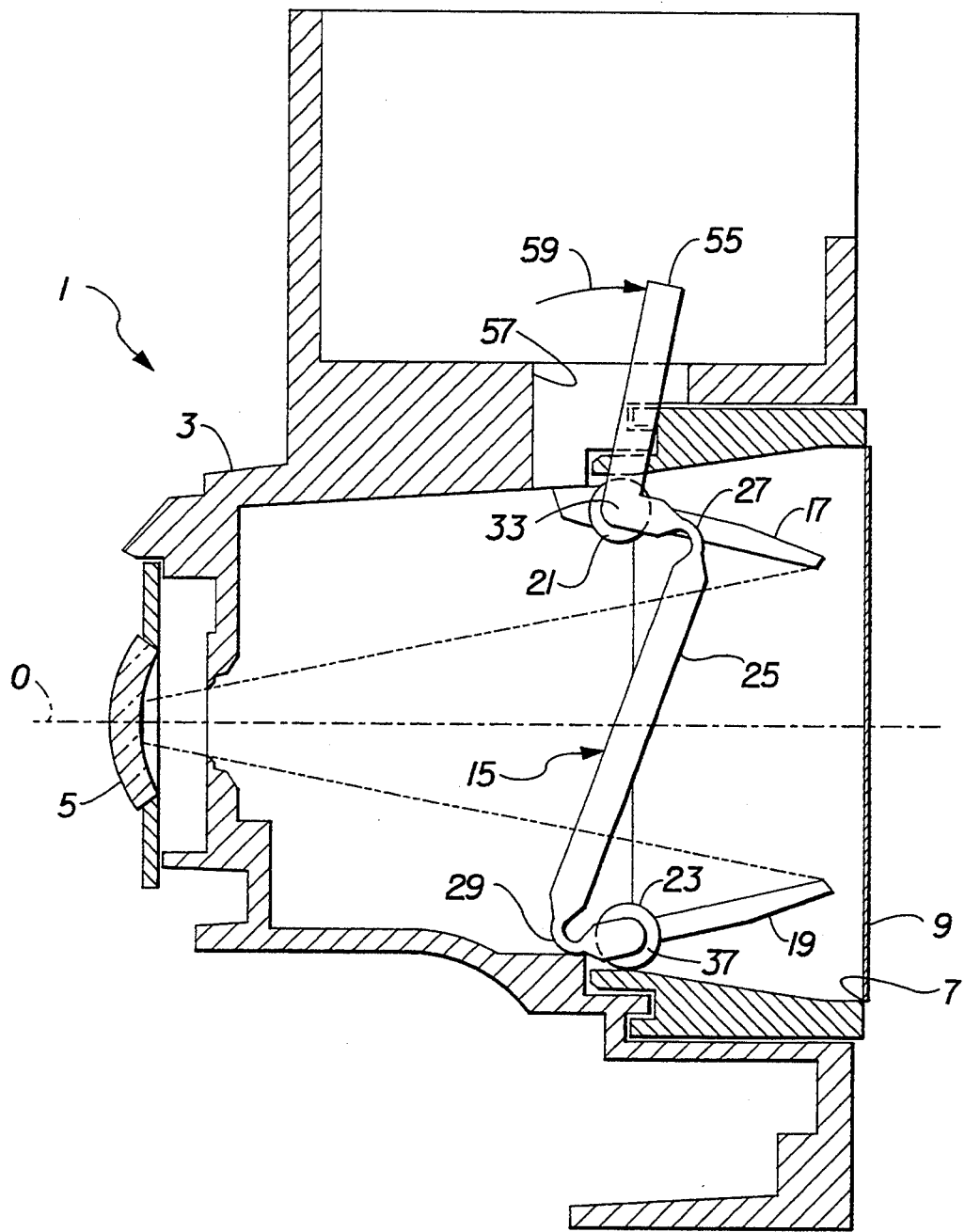
FIG. 4 is a side elevation view of the camera body, showing the masking blade assemblage with its pair of masking blades in their masking position.

Referring now to FIGS. 1 and 4 of the drawings, a photographic camera 1 has a camera body or housing 3 with a known taking lens 5 and a back frame opening 7 which are each centered on an optical axis 0 of the taking lens. The back frame opening 7 is rectangular shaped for making full size (about 24.4 mm×36.4 mm) exposures on respective sections of a 35 mm filmstrip 9 successively held at the back frame opening by a pressure plate (not shown). The camera body 3 has a cartridge receiving chamber 11 for a conventional 35 mm film cartridge (not shown) which normally contains the filmstrip 9 and another chamber 13 for holding the filmstrip removed from the film cartridge.

A masking blade assemblage 15 comprises a pair of similarly dimensioned masking blades 17 and 19 with respective pivot shafts 21 and 23 connected by means of a connecting link 25. The masking blades 17 and 19, the pivot shafts 21 and 23, and the connecting link 25 are integral, that is, they are formed as a unit to be one-piece or unitary. As shown in FIGS. 2–5, the connecting link 25 has a pair of reduced width elastic portions which constitute respective living hinges 27 and 29 located close to the pivot shafts 21 and 23.

Figure 2:
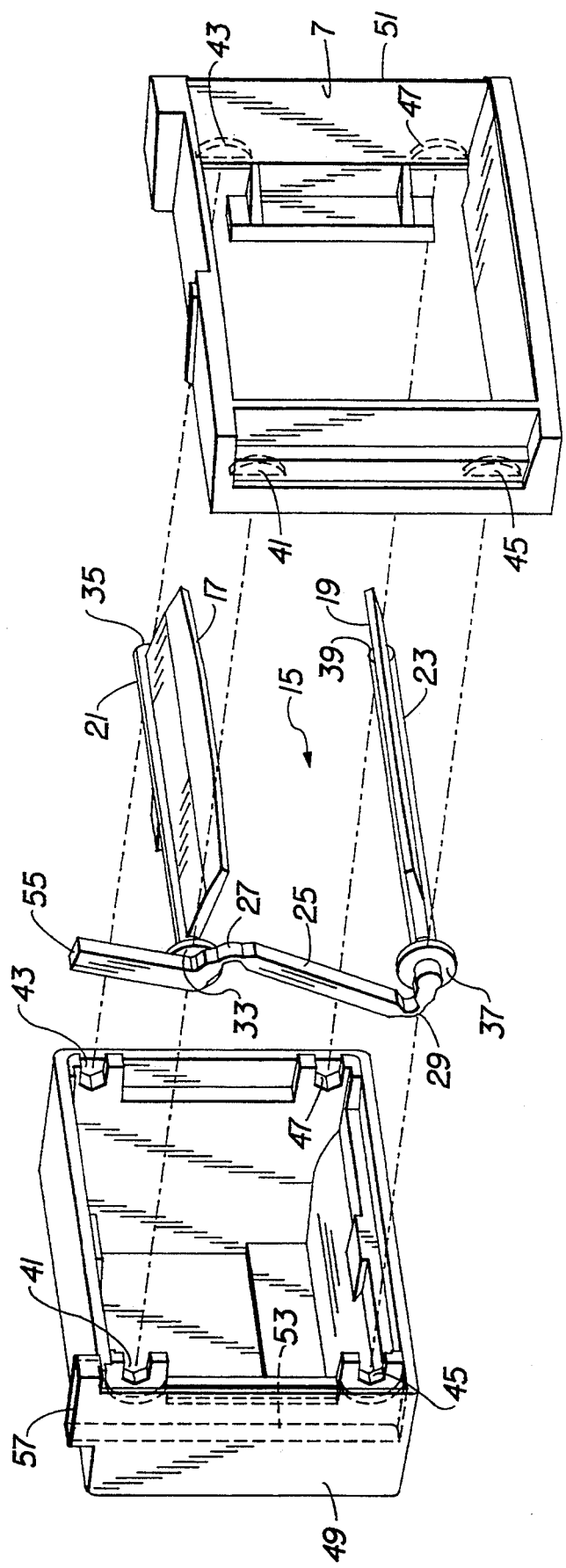
FIG. 2 is an exploded perspective view of a one-piece masking blade assemblage, including the pair of masking blades, and front and rear mounting supports within the camera body for the masking blade assemblage.
Figure 3:
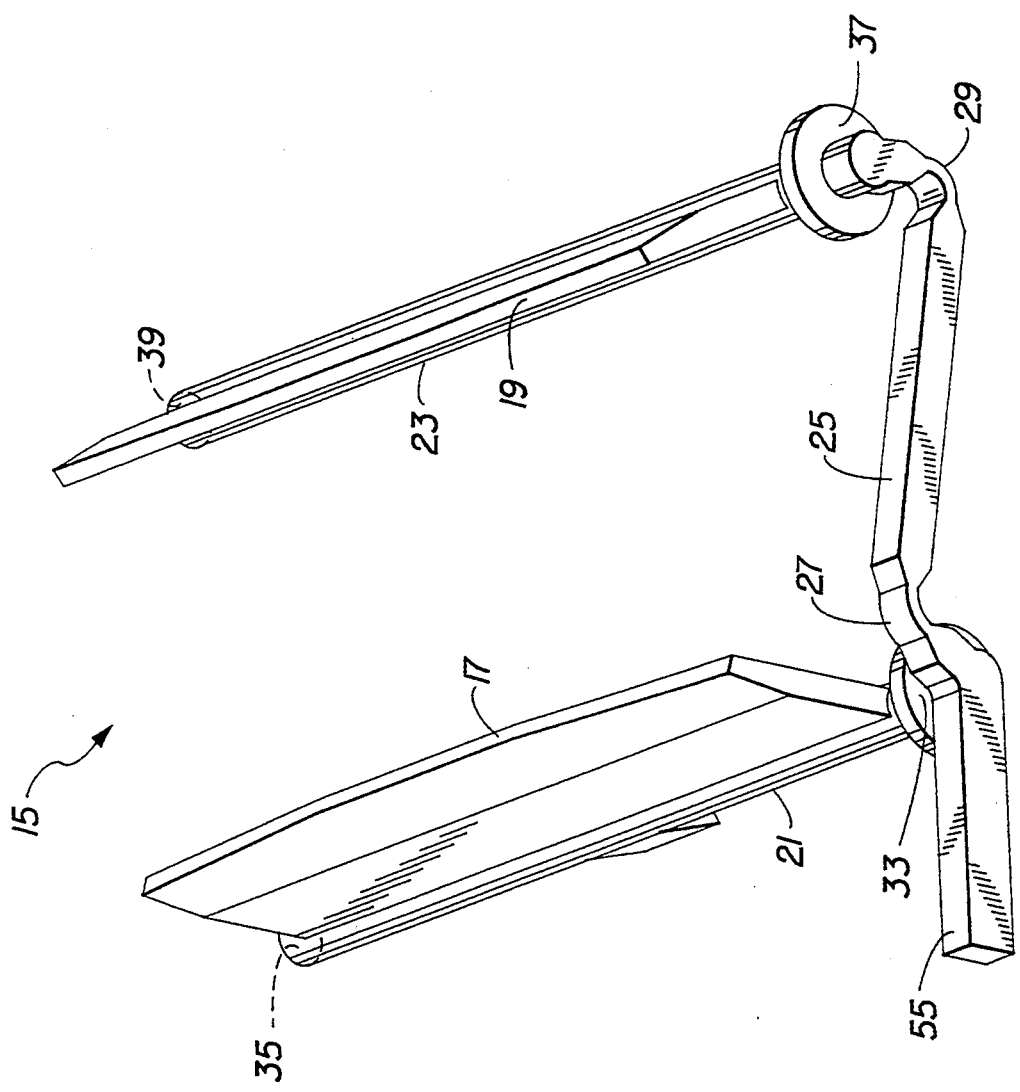
FIG. 3 is a perspective view of the masking blade assemblage.

As viewed in FIG. 2, the four opposite ends 33, 35, 37, and 39 of the pivot shafts 17 and 19 fit into respective bearing recess-halves 41, 43, 45, and 47 of mating front and rear mounting elements 49 and 51 of the camera body 3 to support the masking blades 17 and 19 for pivotal movement in opposite directions between a masking position and a non-masking position. The connecting link 25 is located in a side slot 53 formed in the front mounting element 49, and an actuation extension 55 of the pivot shaft 21 protrudes upwardly through a top opening 57 out of the side slot. See FIG. 1.

Figure 6:
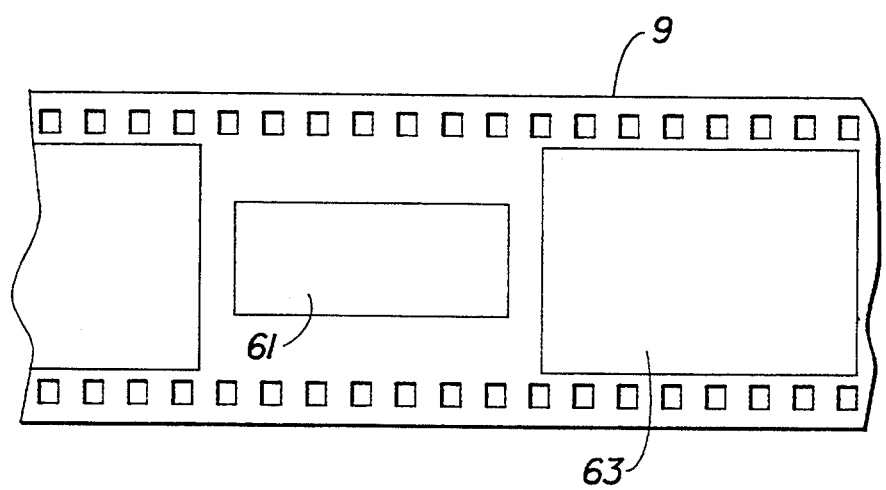
FIG. 6 is a plan view of a filmstrip with interspersed full size and panoramic size exposures.

To locate the masking blades 17 and 19 in their masking position, the actuation extension 55 is swung clockwise as indicated by the arrow 59 in FIG. 4 to similarly rotate the pivot shaft 21, which causes the connecting link 25 via its living hinges 27 and 29 to oppositely rotate the pivot shaft 23. Consequently, the masking blades 17 and 19 are swung in opposite directions towards one another to their masking position. In the masking position, the masking blades 17 and 19 mask an uppermost rectangular portion and a lowermost rectangular portion of the back frame opening 7 to allow only a panoramic size (about 13.3 mm×36.4 mm) exposure 61 to be made on the filmstrip 9 at the back frame opening. See FIG. 6.

Figure 5:
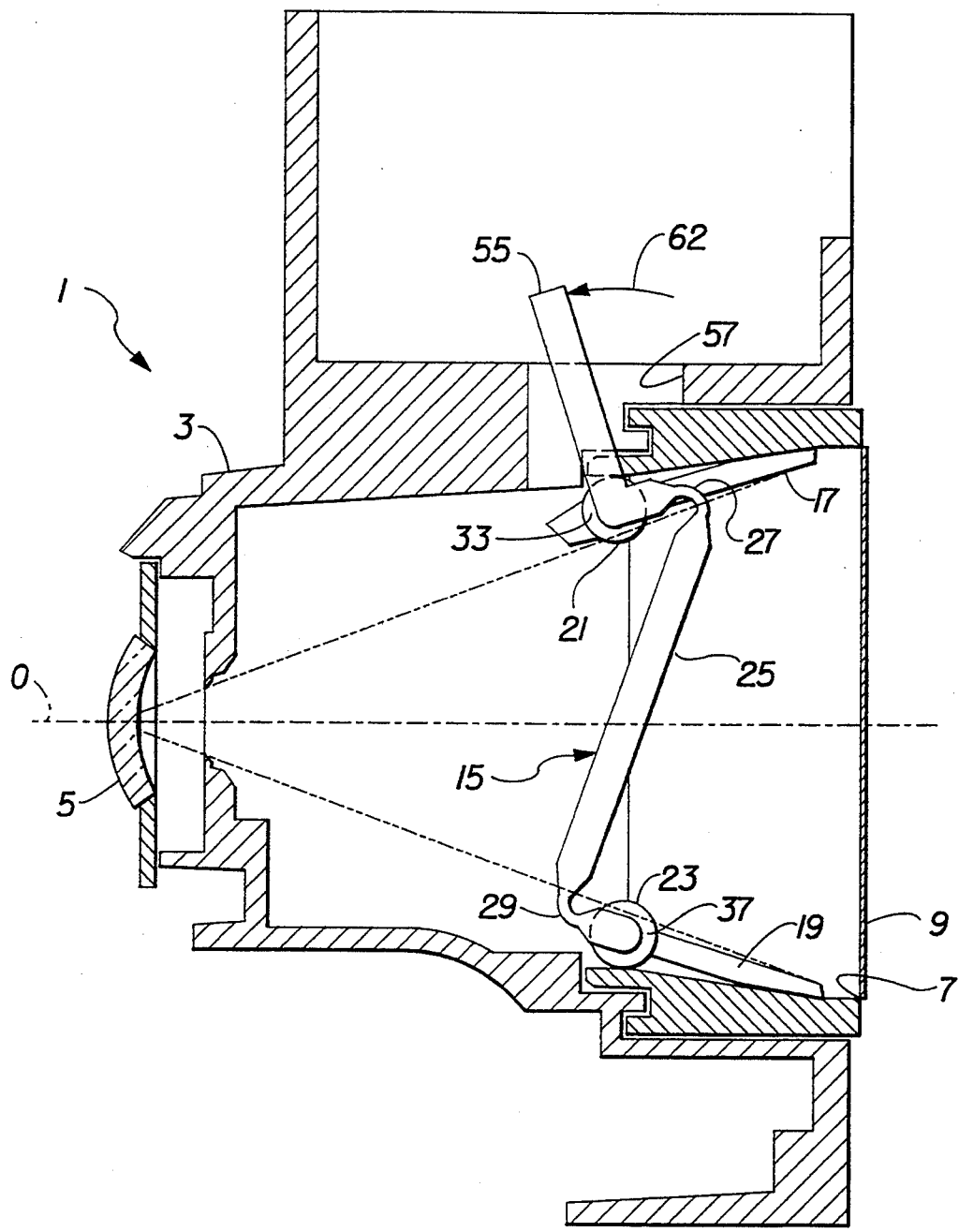
FIG. 5 is a side elevation view similar to FIG. 4, showing the masking blade assemblage with its pair of masking blades in a non-masking position.

To locate the masking blades 17 and 19 in their non-masking position, the actuation extension 55 is swung counter-clockwise as indicated by the arrow 62 in FIG. 5 to similarly rotate the pivot shaft 21, which causes the connecting link 25 via its living hinges 27 and 29 to oppositely rotate the pivot shaft 23. Consequently, the masking blades 17 and 19 are swung in opposite directions away from one another to their non-masking position. In the non-masking position, the masking blades 17 and 19 do not mask the uppermost rectangular portion and the lowermost rectangular portion of the back frame opening 7. Instead, they allow only a full size (about 24.4 mm×36.4 mm) exposure 63 to be made on the filmstrip 9 at the back frame opening. See FIG. 6.

As shown in FIG. 1, a top portion of the actuation extension 55 (that protrudes through the opening 57) is located in an opening 65 in a rocker arm 67 which is connected by means of a pivot pin 69 to the camera body 3. Movement of the rocker arm 67 in opposite directions swings the actuation extension 55 in its clockwise and counter-clockwise directions 59 and 62 as viewed in FIGS. 4 and 5. A manual format selector 71 is mounted on a transparent-plastic top plate 73 of the camera body 3 for sliding movement in opposite directions to shift a panoramic masking frame 75 either behind a front viewfinder lens 77 integral with the top plate or removed from the viewfinder lens. When the masking frame 75 is located behind the front viewfinder lens 77, it provides a panoramic view of a subject to be photographed which has an aspect ratio similar to the aspect ratio of the panoramic exposure 61. The masking frame 75 includes a depending lug 79 which is located between opposite ears 81 and 83 of the rocker arm 67 to move the rocker arm in opposite directions in accordance with movement of the manual format selector 71. Thus, when the selector 71 is moved to the right as shown in FIG. 1, the masking blades 17 and 19 will be moved to their masking position to make a panoramic size exposure 61 and the masking frame 75 will be located behind the front viewfinder lens 77. Conversely, when the selector 71 is moved to the left in FIG. 1, the masking blades 17 and 19 will be moved to their non-masking position to allow a full size exposure 63 to be made and the masking frame 75 will be removed from the front viewfinder lens 77.

The manual format selector 71 includes a spring-biased locking element 85 that alternatively is received in separate notches 87 and 89 cut in the top plate 73

When the locking element 85 is in the notch 87, the masking frame 75 is removed from the front viewfinder lens 77. When the locking element 85 is in the notch 89, the masking frame 75 is located behind the front viewfinder lens 77.

The invention has been described with reference to a preferred embodiment. However, it will be appreciated that variations and modifications can be effected within the ordinary skill in the art without departing from the scope of the invention.

PARTS LIST FOR FIGS. 1–6

1. photographic camera
3. camera body
5. taking lens
7. back frame opening
O. optical axis
9. filmstrip
11. cartridge-receiving chamber
13. other chamber
15. masking blade assemblage
17 & 19. masking blades
21 & 23. pivot shafts
25. connecting link
27 & 29. living hinges
33, 35, 37, & 39. opposite ends of pivot shafts 21 & 23
41, 43, 45, & 47. bearing recess-halves
49. front mounting element
51. rear mounting element
53. side slot
55. actuation extension of connecting link 25
57. top opening
59 & 62. arrows
61. panoramic size exposure
63. full size exposure
65. opening
67. rocker arm
69. pivot pin
71. manual format selector
73. top plate
75. panoramic masking frame
77. front viewfinder lens
79. depending lug
81 & 83. opposite ears
85. locking element
87 & 89. notches

What is claimed is:

1. A photographic camera capable of taking various size exposures comprises a back frame opening for making a full size exposure on a film in said camera, and masking blades having respective pivot shafts for pivotal movement of said masking blades between a masking position for masking corresponding portions of said back frame opening to allow only a reduced size exposure to be made on the film and a non-masking position not masking said corresponding portions of the back frame opening to allow a full size exposure to be made on the film, and is characterized in that:

said masking blades are connected via a connecting link having a pair of elastic portions which constitute living hinges located proximate said pivot shafts to permit the masking blades to be pivoted between their masking and non-masking positions.

2. A photographic camera as recited in claim 1, wherein said masking blades and said connecting link are integral to be one-piece.

3. A photographic camera as recited in claim 1, wherein said pivot shafts are integral with said masking blades to be one-piece.

* * * * *

UNITED STATES PATENT AND TRADEMARK OFFICE
CERTIFICATE OF CORRECTION

PATENT NO. : 5,353,076
DATED : October 4, 1994
INVENTOR(S) : William H. Goddard

It is certified that error appears in the above-indentified patent and that said Letters Patent is hereby corrected as shown below:

Column 4, line 59, after "tute" insert --respective--.

Signed and Sealed this

Seventh Day of March, 1995

Attest:

BRUCE LEHMAN

*Attesting Officer*     *Commissioner of Patents and Trademarks*